United States Patent
Teglia

(10) Patent No.: US 11,921,893 B2
(45) Date of Patent: Mar. 5, 2024

(54) CONNECTED DEVICE ADAPTED TO MEASURE AT LEAST A PHYSICAL QUANTITY

(71) Applicant: THALES DIS FRANCE SAS, Meudon (FR)

(72) Inventor: Yannick Teglia, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 253 days.

(21) Appl. No.: 17/281,059

(22) PCT Filed: Sep. 18, 2019

(86) PCT No.: PCT/EP2019/074977
§ 371 (c)(1),
(2) Date: Mar. 29, 2021

(87) PCT Pub. No.: WO2020/069867
PCT Pub. Date: Apr. 9, 2020

(65) Prior Publication Data
US 2021/0342481 A1    Nov. 4, 2021

(30) Foreign Application Priority Data
Oct. 4, 2018   (EP) ..................... 18306312

(51) Int. Cl.
*G06F 21/62* (2013.01)
*G01R 29/26* (2006.01)
(52) U.S. Cl.
CPC ......... *G06F 21/6254* (2013.01); *G01R 29/26* (2013.01)

(58) Field of Classification Search
CPC ............................ G06F 21/6254; G01R 29/26
See application file for complete search history.

(56) References Cited

U.S. PATENT DOCUMENTS 10,970,441 B1 *   4/2021   Zhang ................... G06N 3/063
10,976,239 B1 *   4/2021   Hart ........................ G01S 7/499
(Continued)

FOREIGN PATENT DOCUMENTS

JP      2014063069 A     4/2014

OTHER PUBLICATIONS

Mobile Device Identification via Sensor Fingerprinting, Hristo Bojinov, et al., Stanford University and National Research & Simulation Center, Rafael Ltd., Aug. 6, 2014, Cite as: arXiv:1408.1416v1 [cs.CR].

(Continued)

*Primary Examiner* — Stephen T Gundry

(57) ABSTRACT

A connected device with at least one sensor adapted to measure at least a physical quantity and to report a measure of this physical quantity to a remote device, the at least one sensor system providing an output Z which is then digitized in order to provide an output signal Y having a first and a second component, the first component being representative of the measured physical quantity X and the second component being representative of the structural noise R introduced by the at least one sensor. The connected device also has a noise generator configured to generate using as an input at least one parameter representative of the structural noise R a blurring noise V which is uncorrelated with said structural noise R; combine the digital output signal Y with the blurring noise V in order to generate a signal Y'; transmit signal Y' to the remote device.

20 Claims, 1 Drawing Sheet

(56) References Cited

U.S. PATENT DOCUMENTS

| | | | | |
|---|---|---|---|---|
| 2006/0042960 | A1* | 3/2006 | Tice | G01N 33/0006 |
| | | | | 204/406 |
| 2012/0259572 | A1* | 10/2012 | Afzal | G01C 21/183 |
| | | | | 702/92 |
| 2015/0261959 | A1* | 9/2015 | Ukil | G06F 21/6254 |
| | | | | 726/25 |
| 2016/0072891 | A1* | 3/2016 | Joshi | H04L 41/0806 |
| | | | | 370/254 |
| 2017/0023630 | A1* | 1/2017 | Zettler | G01R 31/2829 |
| 2018/0240216 | A1 | 8/2018 | Dirik | |
| 2021/0077006 | A1* | 3/2021 | Salti | A61B 5/7275 |
| 2021/0124977 | A1* | 4/2021 | Panetta | G06V 10/40 |
| 2021/0127080 | A1* | 4/2021 | Okura | H04N 25/00 |
| 2021/0176388 | A1* | 6/2021 | Douady-Pleven | H04N 23/70 |
| 2021/0192349 | A1* | 6/2021 | Lian | G06T 5/003 |
| 2021/0217141 | A1* | 7/2021 | Courtney | A61B 8/5207 |
| 2021/0303060 | A1* | 9/2021 | Kalliola | G06F 3/0346 |
| 2022/0114709 | A1* | 4/2022 | Rahmati | G06T 5/20 |
| 2022/0142510 | A1* | 5/2022 | Hassan | G16Z 99/00 |
| 2022/0197255 | A1* | 6/2022 | Cella | G06N 3/006 |
| 2022/0300070 | A1* | 9/2022 | Lodice | G01S 15/08 |
| 2022/0327670 | A1* | 10/2022 | Ziesche | G06T 5/20 |
| 2022/0365147 | A1* | 11/2022 | Close | G01R 35/00 |
| 2022/0373362 | A1* | 11/2022 | Raman | G01D 18/008 |

OTHER PUBLICATIONS

Dafale Ninad N., et al: "Sensor pattern noise based source anonymization", 2017 Third International Conference on Sensing, Signal Processing and Security (ICSSS), IEEE, May 4, 2017, pp. 93-98, XP033228439. DOI: 10.1109/SSPS.2017.8071572 Chapter I-III.

PCT/EP2019/074977, International Search Report, dated Nov. 20, 2019, European Patent Office, P.B. 5818 Patentlaan 2 NL—2280 HV Rijswijk.

PCT/EP2019/074977, Written Opinion of the International Searching Authority, dated Nov. 20, 2019, European Patent Office, D-80298 Munich.

* cited by examiner

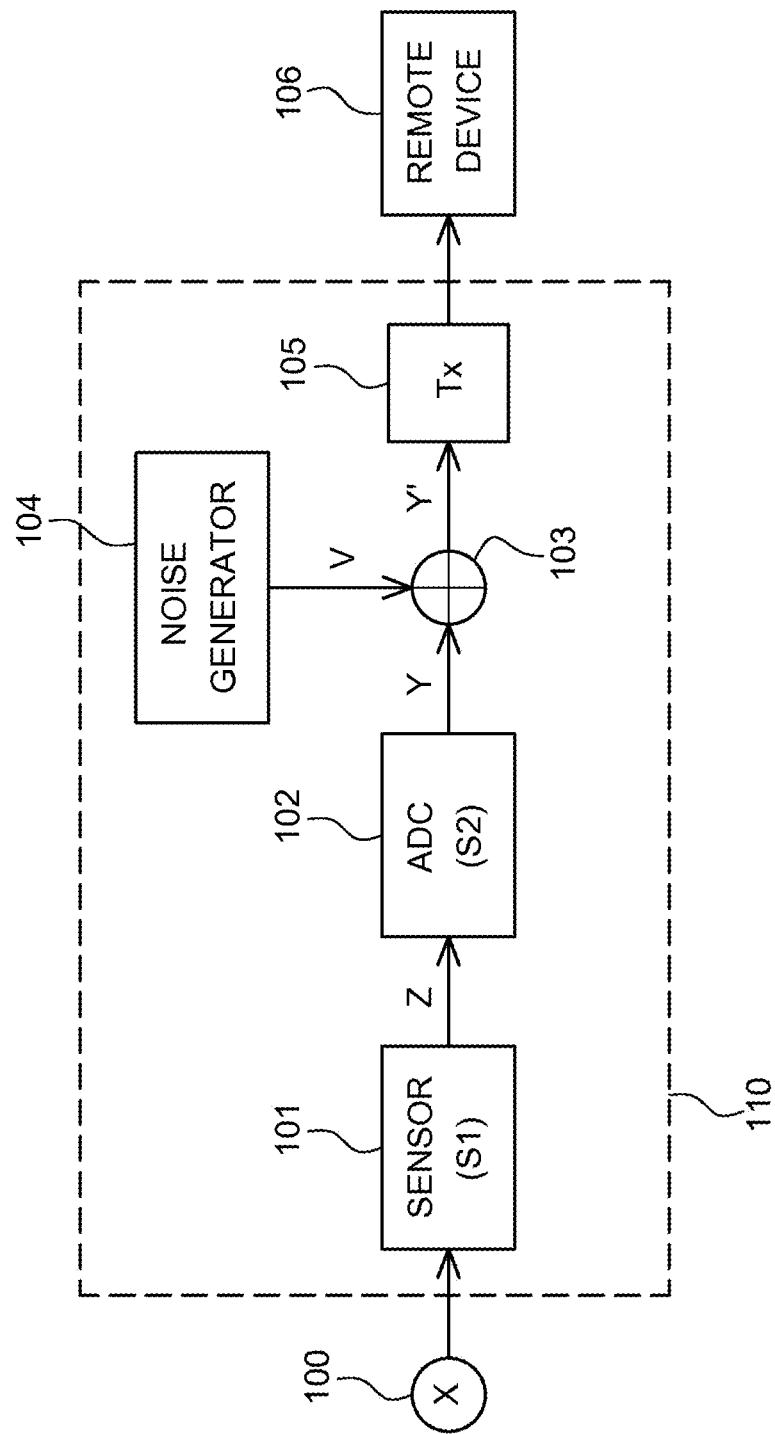

CONNECTED DEVICE ADAPTED TO MEASURE AT LEAST A PHYSICAL QUANTITY

TECHNICAL FIELD

The present invention relates to a connected device adapted to measure at least a physical quantity and to add a blurring noise to the measurement signal. It is applicable to electronic sensors embedded in connected devices.

BACKGROUND OF THE INVENTION

According to the Recommendation ITU-T Y.2060 provided by the International Telecommunication institute, the Internet of things (IoT) is defined as a global infrastructure for the information society, enabling advanced services by interconnecting physical and virtual things based on existing and evolving interoperable information and communication technologies. A thing is an object of the physical world (physical things) or the information world (virtual things), which is capable of being identified and integrated into communication networks. At present, IoT is generally applied in fields such as security surveillance, automatic vending machines, public traffic systems, vehicle monitoring and management, industry process automatization, motor machineries, city informationalization.

In this description, the expression connected device refers to a piece of equipment with communication and sensing capabilities. A connected device comprises for example a wireless communication module also called Machine Type Communication (MTC) module allowing transmission of data from one IoT device to another or exchange of data between machines through UMTS/HSDPA, CDMA/EVDO, LTE, 5G, LoRa or other network technologies.

Modern connected devices such as mobile phones are generally implemented with a plurality of sensors. A sensor is a component which is configured to get information about the surrounding physical world, for example by measuring a quantity from the physical world and/or to detect an activity. It is for example adapted to provide an output signal that can be processed for taking a decision or transmitted to a remote device using a communication link.

Here are several examples of sensors that are extensively used today: accelerometers, temperature sensors and motion sensors. This list is provided here for exemplary purposes only and the skilled person can understand that other type of sensors can also be considered in the context of the invention.

As the connected devices are collecting analogue data, they are somehow unique so that apparently identical connected device are likely to produce subtle differences for the same objective data. The main reason is that each sensor embedded in the connected device contains slight defaults inherent to their conception and impacting the signal resulting from the analogue data capture. For that reason, two sensors of the same design are producing different output signals when exposed to the same stimuli.

The aforementioned connected devices are collecting analogue data using their one or several embedded sensors and the unique characteristics of these sensors are impacting the way they are generating their output signals. Therefore, each connected device can appear as unique and data coming from a given engine can be considered as a signature allowing identification of said connected device. Therefore, the source of the data, that is to say the connected device having generated the data, can be identified by a malevolent user using simple signal processing techniques. For example, it is illustrated in the article entitled "There Goes Your PIN: Exploiting Smartphone Sensor Fusion Under Single and Cross User Setting", David Berend, Bernhard Jungk, Shivam Bhasin, IACR Cryptology ePrint Archive 2017: 1169 (2017), how motion sensors embedded in a smartphone can reveal the user's PIN.

Therefore, there is a need of a method allowing to better anonymize data provided by a connected device.

SUMMARY OF THE INVENTION

The invention relates to a connected device comprising at least one sensor adapted to measure at least a physical quantity and to report a measure of this physical quantity to a remote device, the at least one sensor system providing an output Z which is then digitized in order to provide an output signal Y comprising a first and a second component, the first component being representative of the measured physical quantity X and the second component being representative of the structural noise R introduced by the at least one sensor, wherein the connected device also comprises a noise generator configured to:
  generate using as an input at least one parameter representative of the structural noise R a blurring noise V which is uncorrelated with said structural noise R;
  combine the digital output signal Y with the blurring noise V in order to generate a signal Y';
  transmit signal Y' to the remote device.

According to an example, the blurring noise V is generated in order to have the same order of magnitude as the structural noise R.

According to an example, the at least one parameter representative of the structural noise R is determined by measuring signal Y when the connected device is put into artificial conditions in which the physical quantity X remains constant over time.

According to an example, the measurements of the Y signal for determining the at least one parameter representative of the structural noise R is carried out using variable conditions, such as variable voltage conditions or variable temperature conditions.

According to an example, a distribution law of the structural noise R is estimated using a Monte-Carlo method applied on signal Y generated when the connected device is put into artificial conditions, said estimated distribution law being used as a parameter for generating the blurring noise V.

According to an example, the minimum r_min and maximum r_max values of R are determined by collecting instances of Y when the connected device is put is said artificial conditions, r_min and r_max being used as parameters to generate the blurring noise V.

According to an example, the blurring noise V is generated using a Gaussian distribution with r_min and r_max being used as parameters to derive the mean and the standard deviation of said Gaussian distribution.

According to an example, the blurring noise V is generated using a uniform distribution with r_min and r_max being used as V lower and upper boundaries.

According to an example, the at least one sensor is implemented using CMOS technology.

BRIEF DESCRIPTION OF THE DRAWINGS

Additional features and advantages of the invention will be more clearly understandable after reading a detailed description illustrating embodiments of the invention, given as an indicative and non-limitative example, in conjunction with the following drawing:

FIG. 1 schematically illustrates the principle of blurring the signal generated by a sensor embedded in a connected device.

DETAILED DESCRIPTION

The principle of the invention is to add an artificially generated noise signal to the signal provided by a set of one or several sensor and carrying a useful component. The useful component represents a measured quantity acquired by the sensor from the physical world.

FIG. 1 schematically illustrates the principle of blurring the signal generated by a sensor embedded in a connected device.

According to this example, a physical quantity 100 noted X is measured by a connected device 110. The connected device 110 comprises a sensor 101 configured to generate an analogue signal Z:

$$Z=S1(X)$$

This analogue signal Z comprises a first signal component representative of the measured quantity X which can be considered as the useful part of the signal, that is to say the one containing useful information that is intended to be processed and/or transmitted. In addition, the analogue signal Z also carries a second component corresponding to a structural noise SN introduced by the sensor 101. The structural noise is an unwanted signal coming from the sensor's characteristics and potentially from other parts of the connected device involved in the sensing.

The design of an electronic device is an abstraction of its further physical implementation. When actually built, two implementations from the same source code yields to two different physical objects. In fact, the quantity of materials will slightly differ due to environmental conditions, to the manufacturing machines that will be different, or identical but with a drift in its parameters. All this causes manufacturing variations. It is up to the manufacturer to limit those variations, that is to say the noise, in acceptable bounds so that the functionality remains, and is reliable enough such that it provides a good signal to noise ratio. Note that the description takes CMOS technology as an example, but is also applicable to other technologies such as for TTL circuits.

CMOS devices contain different sort of noises. Seven have been reported in the article of Kent H. Lundberg entitled "Noise Sources in Bulk CMOS", 2002. Their nature, that is to say the random distribution law they follow, is different and vary from white noise to pink noise. The white noise of the CMOS devices is usually exploited to provide unpredictable random numbers in the Physically True Random Number Generators (PTRNG). But it happens that some other unexpected properties of the CMOS devices also appear, showing a deterministic or quasi-deterministic part. This can be for instance used for generating Physically Unclonable Functions (PUF), as depicted in article written by Lilian Bossuet, Xuan Thuy Ngo, Zouha Cherif and Viktor Fischer entitled "A PUF based on a transient effect ring oscillator and insensitive to locking phenomenon", IEEE transactions on emerging topics in computing, October 2013. It has been shown that the number output of such constructions is made of three parts. The first one is linked to the design and then will always be the same for all devices using the same implementation. The last one is made of uniformly distributed random numbers used for true random number generator (TRNG) whose origin comes from the above mentioned noises. The in-between part is chip dependent and due to manufacturing process. This part will be used as the PUF, the identity of the hardware IP. In the context of this invention, it is the manufacturing process side effect which is of particular interest that causes some part of the noise as being IP dependent.

According to an aspect of the invention, the connected device is composed by a set of different chips on a printed circuit board (PCB). Each of these chips will have its own signature. The skilled person will understand that the invention is also applicable of IP blocs composing a System-on-Chip (SoC).

According to an aspect of the invention, the analogue signal Z is converted into a digital signal Y using a digital to analogue converter 102. This conversion can be expressed as:

$$Y=S2(Z)=S2(S1(X))=S1oS2(X)=S(X)$$

where:
S2( ) is a function representing the conversion performed by the analogue-to-digital converter 102;
o is an operator showing that function S is a composite function of S1 and S2.

A noise generator 104 is also represented. It provides an artificially generated noise V which is then be added 103 to the digital signal Y in order to generate a signal Y'. Y' can therefore be expressed as follow:

$$Y'=Y+V$$

The signal Y' is then transmitted 105 to a remote device 106.

One important aspect of the invention is that the generation of the artificial noise V, also called blurring noise, is derived from an estimation of the structural noise SN, or more precisely, to the digitized contribution R of signal SN to the signal Y.

According to an embodiment, the blurring noise V is generated in order to have the same order of magnitude as the digitized contribution R of the structural noise SN. In the sequel, for simplification purpose, the digitized contribution R is designated as the structural noise.

As a consequence, the blurring noise V will be significant enough to blur noise R and therefore to avoid the identification of the connected device by a malevolent person while being sufficiently negligible to keep the useful part of signal Y' usable, that is to say to allow recovering measurements of the physical quantity X and if needed to efficiently apply a digital processing.

As the structural noise is negligible compared to the useful part of Y, adding a blurring noire which has the same order of magnitude as of the estimated structural noise will allow keeping the signal to noise ratio high enough for high quality measurement of the physical world.

For estimating the characteristics the digitized contribution R of the structural noise SN, several embodiments can be considered.

According to an embodiment, the estimation of the structural noise characteristics is carried out during the manufacturing of the connected device by the original equipment manufacturer (OEM).

According to an example, the connected device or the sensor is put into some artificial conditions before being integrated in the connected device where the physical quantity to be measured remains constant over time. Therefore, the useful data to be captured remains identical and the contribution of the structural noise to the output signal can be analysed.

For example, if the sensor is implemented using Complementary Metal Oxide Semiconductor (CMOS) technology, process variations will lead to different digital values for the samples composing signal Y, event if the input signal X of the system is constant:

$$Y=\{y(t),y(t+1),\ldots,y(t+k),\ldots,y(t+n)\}$$

where y(t) and y(t+k) represent the realizations of Y respectively at the instants t and t+k.

As the input signal X remains constant, one can write the corresponding set of n samples as:

$$X=\{x(t),x(t+1),\ldots,x(t+k),\ldots,x(t+n)\}=\{C,C,\ldots,C,\ldots,C\}$$

where C represents a real constant value.
Further, Y can also be written as follow:

$$Y=S(X)=W(X,R)$$

where W( ) represents the transfer function of the system taking into account the structural noise R inherent to the sensor.

The structural noise R is linked to the CMOS process variations.

In these conditions, Y is a random variable following an unknown law $\mathcal{L}Y$ which can be written as $Y \sim \mathcal{L}Y$.

Further, R is a random variable following an unknown law $\mathcal{L}R$ which can be written as $R \sim \mathcal{L}R$.

When X is constant, one has $Y \sim \mathcal{L}R$. Therefore, $\mathcal{L}R$ can be estimated by measuring the realizations of Y. According to an example, Monte-Carlo methods can be used for this estimation. The book entitled "Handbook of Monte-Carlo Methods" written by D. P. Kroese, T. Taimre, Z. I. Botev, John Wiley & Sons, 2011, provides examples of Monte-Carlo methods.

The characteristics of the structural noise R when X is constant can also be estimated using a method with less computational complexity. For that purpose and according to an embodiment, the minimum r_min and maximum r_min values of R can be obtained by collecting enough instances of Y to get a good confidence in those boundaries, for example during a predefined time interval. In order to acquire values with the best level of reliability, these measurements can advantageously be carried out with different voltage conditions, temperature conditions, and/or using other variable conditions as this is usually done in the semiconductor industry.

It is to be noted that R can be constant, which is a specific case of a random variable.

Once one or several characteristics of the structural noise have been estimated, it is then possible to generate an artificial noise V using this or these characteristics as an input parameter.

For example, the aforementioned upper and lower boundaries, noted respectively r_min and r_max allows to define the following property:

$$\forall t, r\_min \leq r(t) \leq r\_max$$

where r(t) represents the realizations of R at the instant t.

According to an aspect of the invention, the artificially generated noise V is generated such that it is uncorrelated with the structural noise R while being big enough to conceal R and small enough to keep the information obtained from measuring X usable.

According to an embodiment of the invention, V can be generated as a Gaussian noise expressed as:

$$V=N(\mu,\sigma)$$

Where:
μ is the mean of the Gaussian distribution N;
σ is the standard deviation of the Gaussian distribution N.
This is a way for V to be uncorrelated with V.
According to an example, μ and σ can be chosen as follows:

$$\mu = r_{min} + \frac{(r\_max - r\_min)}{2}$$

and:

$$\sigma = \frac{(r\_max - \mu)}{k}$$

where k is a confidence parameter, which is set according to the number of trials that have been used to estimate R. The higher the number of trials, the higher the value of k as the recorded r_min and r_max values are the actual boundaries. For example, k can be chosen as equal to three or six.

As an alternative to the use of a Gaussian distribution, the blurring can be carried out using an uniform noise, that is to say that R can be blurred using a noise V generated using a uniform distribution. Said differently, v(t) has to be generated randomly and in a uniform way into the set [r_min, r_max].

The skilled person will understand that other known distributions can also be used to generate the artificial noise V.

Once generated, V has to be combined with Y, for instance using an adder 103. Alternatively, V can be combined with Y in a subtractive way or any way that is considered as adapted to the sensor implemented in the connected device.

The invention claimed is:

1. A connected device comprising at least one sensor adapted to measure at least a physical quantity and to report a measure of this physical quantity to a remote device, the at least one sensor system providing an output Z which is then digitized in order to provide an output signal Y comprising a first and a second component, the first component being representative of the measured physical quantity X and the second component being representative of the structural noise R introduced by the at least one sensor, wherein the connected device also comprises a noise generator configured to:
 generate, using as an input at least one parameter descriptive of the structural noise R, a blurring noise V which is uncorrelated with said structural noise R;
 combine the digital output signal Y with the blurring noise V in order to generate a signal Y';
 transmit signal Y' to the remote device.

2. The connected device according to claim 1, wherein the blurring noise V is generated in order to have the same order of magnitude as the structural noise R.

3. The connected device according to claim 1, wherein the at least one parameter descriptive of the structural noise R is determined by measuring signal Y when the connected device is put into artificial conditions in which the physical quantity X remains constant over time.

4. The connected device according to claim 3, wherein the measurements of the Y signal for determining the at least one parameter descriptive of the structural noise R is carried out using variable conditions, such as variable voltage conditions or variable temperature conditions.

5. The connected device according to claim 4, wherein a distribution law of the structural noise R is estimated using a Monte-Carlo method applied on signal Y generated when the connected device is put into artificial conditions, said estimated distribution law being used as a parameter for generating the blurring noise V.

6. The connected device according to claim 5, wherein the minimum r_min and maximum r_max values of R are determined by collecting instances of Y when the connected device is put into said artificial conditions, r_min and r_max being used as parameters to generate the blurring noise V.

7. The connected device according to claim 6, wherein the blurring noise V is generated using a Gaussian distribution with r_min and r_max being used as parameters to derive the mean and the standard deviation of said Gaussian distribution.

8. The connected device according to claim 6, wherein the blurring noise V is generated using a Gaussian distribution with r_min and r_max being used as parameters to derive the mean and the standard deviation of said Gaussian distribution.

9. The connected device according to claim 4, wherein the minimum r_min and maximum r_max values of R are determined by collecting instances of Y when the connected device is put into said artificial conditions, r_min and r_max being used as parameters to generate the blurring noise V.

10. The connected device according to claim 9, wherein the blurring noise V is generated using a Gaussian distribution with r_min and r_max being used as parameters to derive the mean and the standard deviation of said Gaussian distribution.

11. The connected device according to claim 9, wherein the blurring noise V is generated using a Gaussian distribution with r_min and r_max being used as parameters to derive the mean and the standard deviation of said Gaussian distribution.

12. The connected device according to claim 9, wherein the blurring noise V is generated using a uniform distribution with r_min and r_max being used as V lower and upper boundaries.

13. The connected device according to claim 3, wherein a distribution law of the structural noise R is estimated using a Monte-Carlo method applied on signal Y generated when the connected device is put into artificial conditions, said estimated distribution law being used as a parameter for generating the blurring noise V.

14. The connected device according to claim 13, wherein the minimum r_min and maximum r_max values of R are determined by collecting instances of Y when the connected device is put into said artificial conditions, r_min and r_max being used as parameters to generate the blurring noise V.

15. The connected device according to claim 14, wherein the blurring noise V is generated using a Gaussian distribution with r_min and r_max being used as parameters to derive the mean and the standard deviation of said Gaussian distribution.

16. The connected device according to claim 14, wherein the blurring noise V is generated using a Gaussian distribution with r_min and r_max being used as parameters to derive the mean and the standard deviation of said Gaussian distribution.

17. The connected device according to claim 3, wherein the minimum r_min and maximum r_max values of R are determined by collecting instances of Y when the connected device is put into said artificial conditions, r_min and r_max being used as parameters to generate the blurring noise V.

18. The connected device according to claim 17, wherein the blurring noise V is generated using a Gaussian distribution with r_min and r_max being used as parameters to derive the mean and the standard deviation of said Gaussian distribution.

19. The connected device according to claim 17, wherein the blurring noise V is generated using a uniform distribution with r_min and r_max being used as V lower and upper boundaries.

20. The connected device according to claim 1, wherein the at least one sensor is implemented using CMOS technology.

\* \* \* \* \*